Sept. 20, 1966  M. A. EGGENBERGER ET AL  3,274,443
REDUNDANT SPEED CONTROL SYSTEM
Filed Dec. 5, 1963  2 Sheets-Sheet 1
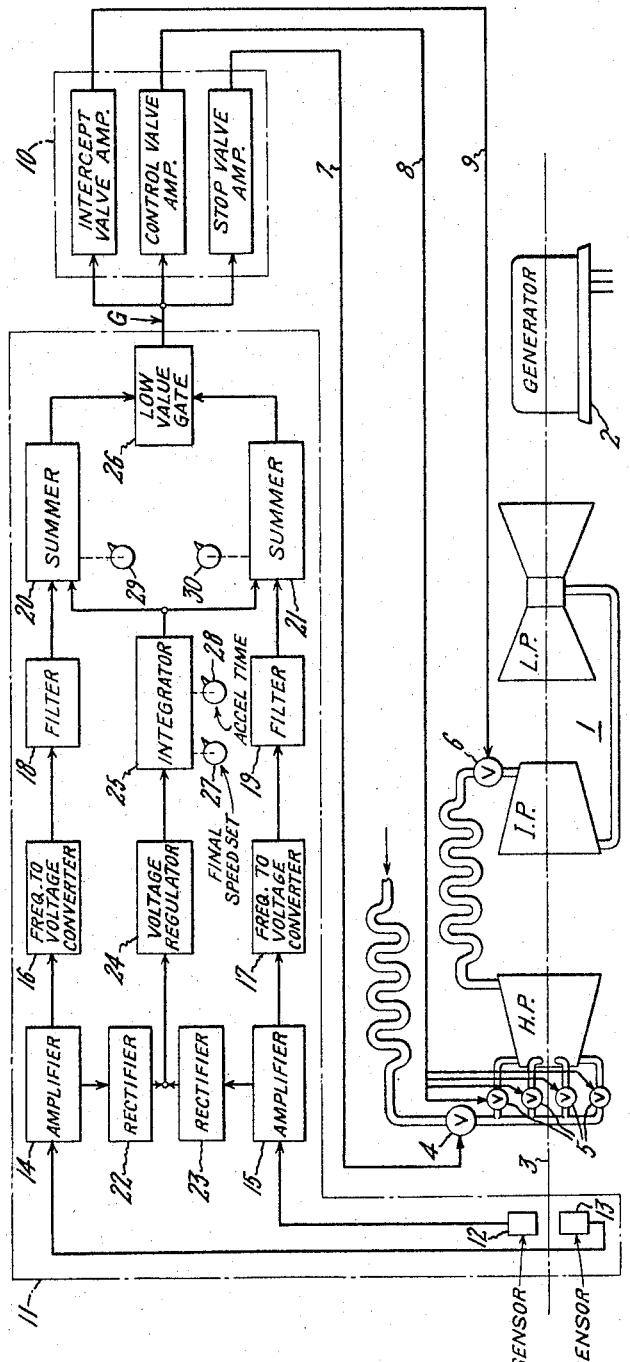
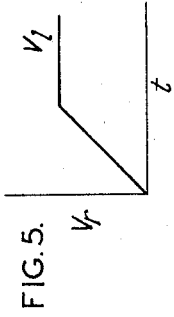
FIG. 5.
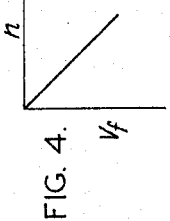
FIG. 7.
FIG. 6.
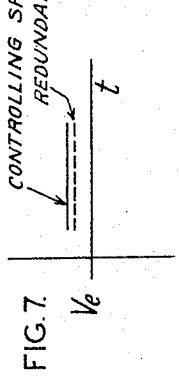
FIG. 4.
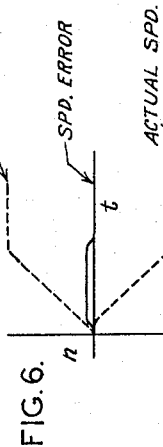
FIG. 3.
Inventors
Markus A. Eggenberger
Paul H. Troutman
by W. C. Crutcher
Their Attorney Inventors
Markus A. Eggenberger
Paul H. Troutman
by W. C. Crutcher
Their Attorney

United States Patent Office 3,274,443
Patented Sept. 20, 1966

3,274,443
REDUNDANT SPEED CONTROL SYSTEM
Markus A. Eggenberger and Paul H. Troutman, Schenectady, N.Y., assignors to General Electric Company, a corporation of New York
Filed Dec. 5, 1963, Ser. No. 328,281
5 Claims. (Cl. 317—5)

This invention relates to an improved speed control system for a prime mover, and more particularly the invention relates to an electrical control system having redundancy features for supplying a reliable electrical signal to control a prime mover.

It is well known that prime movers driving loads, such as large turbine-generators, can be controlled by employing, in lieu of the often-used mechanically-hydraulic governing systems electro-hydraulic systems, wherein electrical signals control hydraulic servo-mechanisms to position the steam valves of the turbine. It is also known that an electrical signal representing desired turbine speed can be provided to increase with time to a final value in an electro-hydraulic control system such as described above, in order to accelerate the turbine-generator smoothly to the final desired speed, as more particularly described, for example, in U.S. Patent 3,098,176 issued to M. A. Eggenberger, P. H. Troutman, and J. J. Sauter on July 16, 1963, and assigned to the assignee of the present application.

It is also known that the speed control portion of an electro-hydraulic control system may be separated from the load control portion, wherein a separate electrical signal representing desired load can be superimposed on an electrical signal representing speed error in order that addition of load may be effected independently of the regulating effects of the speed control system. Such an arrangement is illustrated in U.S. Patent 3,097,488, issued to M. A. Eggenberger, P. H. Troutman, and P. C. Callan on July 16, 1963, and assigned to the assignee of the present application.

The speed selecting and speed sensing components for electro-hydraulic control systems must be of high reliability, in order to reduce the possibility of damage to the turbine-generator in the event of a potential failure of one of the components. More particularly, failure of any single component should preferably allow the turbine-generator to continue operation unimpaired and, if this cannot be achieved, the failure should cause the valves to close so that the turbine-generator will slow down and not overspeed. Failure of any single component should not cause the valves to open wider since this might necessitate emergency action.

Redundant electrical circuits have been known which provide dual electrical signals, either of which will actuate a device in the event of failure to a component in one of the circuits. However, where proper operation of the circuit involves "bucking" or opposite polarity signals, such as found in closed loop or feedback applications, the provision of successful redundancy features presents a considerable problem. Failure of a component may introduce a signal of large magnitude and undesirable polarity or phase into the control network.

Accordingly, one object of the present invention is to provide an improved redundant speed control system for a prime mover.

Another object of the invention is to provide an improved redundant electrical circuit for providing a speed error signal to a prime mover control system, which speed error signal is indicative of the difference between desired speed and actual speed.

Still another object of the invention is to provide an improved electrical circuit for supplying reliable and redundant speed error signals to a turbine electro-hydraulic control system.

Briefly stated, the invention is practised by obtaining two actual speed feedback signals and a single speed reference signal from a common source, summing the single reference signal with each of the speed feedback signals, and passing one of the two resulting error signals through an amplitude comparison device. Failure of a component in one of the two speed control circuits will keep the turbine in operation with a slightly offset reference and failure of a component in both speed control circuits simultaneously will cause the valves to close to prevent overspeeding.

The organization and operation of the invention, together with further objects and advantages thereof, may best be understood by reference to the following description taken in connection with the accompanying drawings, in which:

FIG. 1 is a schematic view of a reheat steam turbine-generator with the improved redundant speed control system shown in block diagram form.

FIG. 3 is a graph of turbine speed versus voltage at point A on FIG. 2,

FIG. 4 is a graph of turbine speed versus voltage at points B, C on FIG. 2,

FIG. 5 is a graph of time versus voltage at point D on FIG. 2,

FIG. 6 is a graph of time versus voltage at points E, F on FIG. 2, and

FIG. 7 is a graph of time versus voltage at point G on FIG. 2.

Figure 2:
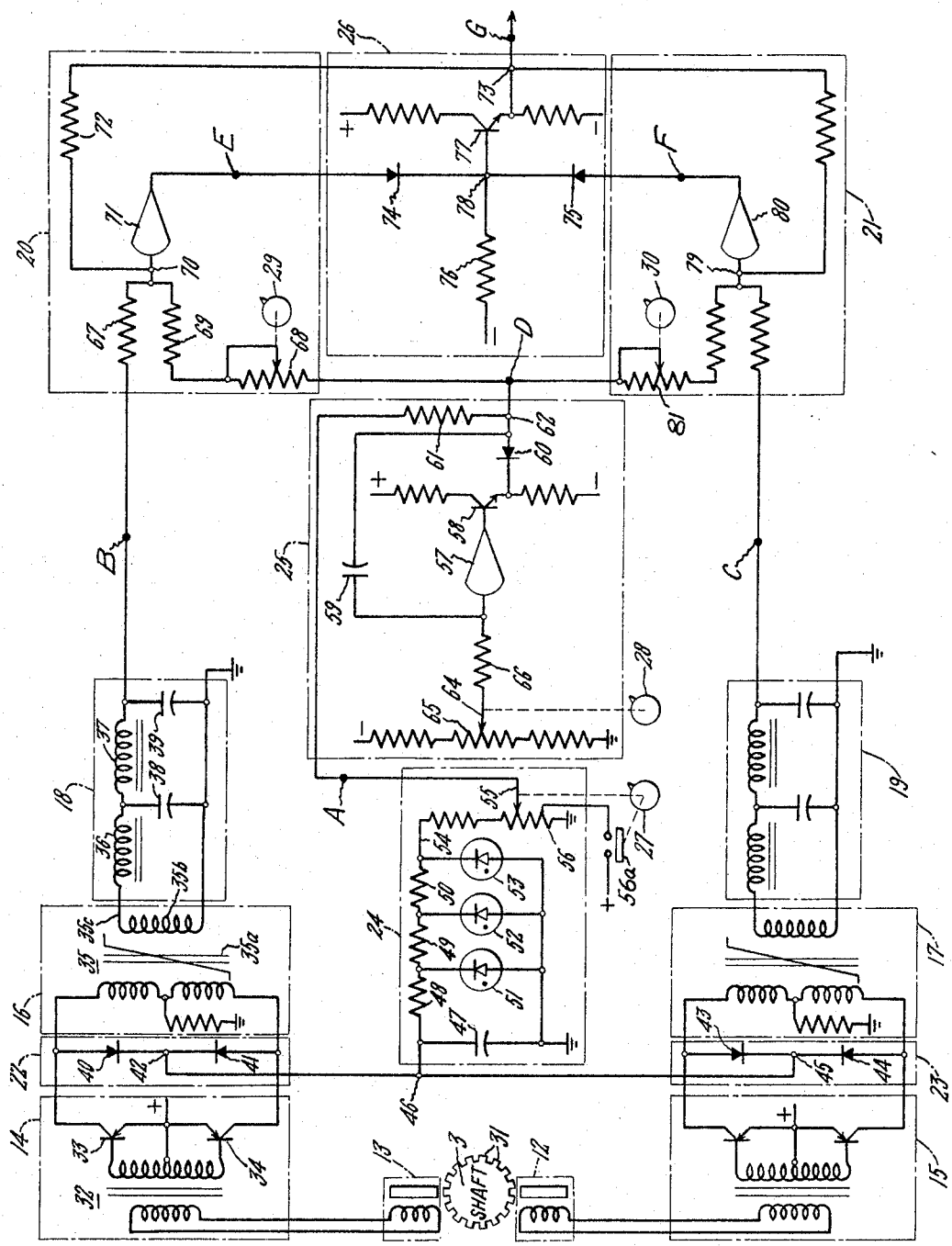
FIG. 2 is a simplified circuit diagram for the speed control system.

Referring now to FIG. 1 of the drawing, a steam turbine, shown generally as 1, drives a generator 2 with a shaft indicated by dot-dash line 3. Some of the valves controlling steam flow are indicated on the drawing as stop valve 4, control valves 5, and intercept valve 6. Valves 4, 5, 6 are actuated by hydraulic servo-mechanisms (not shown) in accordance with D.C. electrical voltages appearing on lines 7, 8, 9 respectively, these electrical potentials being furnished by the load control unit 10 and the speed control unit 11. The arrangement is such that a negative-going signal in lines 7, 8, 9 causes the respective valves to open wider. Preference arrangements, not material to the present invention and normally a part of the load control unit 10, give preference to one valve or another or a combination of them. For example, during acceleration from standstill and up to a specified load, stop valve 4 would normally be controlling steam flow, while governing above a specified load would normally be a function of the control valves 5, through an arrangement similar to that described in U.S. Patent 3,097,489, issued to M. A. Eggenberger and P. H. Troutman on July 16, 1963, and assigned to the assignee of the present application. The speed control system 11, which is the object of the present invention, has as its purpose to provide at point G in FIGS. 1 and 2 a reliable D.C. electrical potential which represents the difference between the actual speed of turbine shaft 3 and a desired turbine speed, the time rate of change and the final value of the latter being adjustable.

The major components of the speed control system 11 shown in block diagram form, include sensors 12, 13 and two actual speed channels comprising identical amplifiers 14, 15, identical frequency-to-voltage converters 16, 17, identical filters 18, 19, and identical summers 20, 21. Amplifiers 14, 15 also supply rectifiers 22, 23 respectively whose outputs are both applied to a voltage regulator 24. The voltage regulator 24 provides a precise limiting voltage for an integrator 25. The integrator 25 furnishes duplicate speed reference signals to summers 20, 21, each of which combines this reference signal with one of the separate speed feedback signals. The two resulting substantially duplicate speed error signals are furnished to an amplitude comparison device designated the "low value gate" 26, which allows only the speed error signal which would give the greater valve closing signal to pass through the gate. The major external adjustments for speed control unit 11 include the "desired final speed setting" knob 27, the "accelerating time" knob 28, and knobs 29, 30, which provide a preference for summer 20 or summer 21.

Referring now to FIG. 2 of the drawing, a circuit diagram is shown for the speed control unit 11, wherein the various elements on the block diagram of FIG. 1 are delineated and assigned the same reference numerals. The speed sensors 12, 13 comprise variable reluctance or magnetic pickups mounted in close proximity to uniformly spaced teeth 31 on turbine shaft 3. The output from each sensor 12, 13 is a square wave which is amplified by each of the power amplifiers 14, 15.

Since the components of the two actual speed sensing channels are identical, only the one at the top of the drawing will be described in detail. Amplifier 14 is coupled to speed sensor 13 by a transformer 32, the secondary of which is connected to two PNP transistors 33, 34 arranged in push-pull relationship and operating in switching mode to provide a high power square wave of the same frequency as sensed by sensor 13. The square wave is furnished as the input to the frequency-to-voltage converter 16. This comprises a tranformer 35 with a special saturating core 35a. The core 35a saturates on each pulse and the average voltage appearing in the secondary winding 35b is directly proportional to the frequency of the pulses. The connections of the windings are such as a D.C. voltage $V_f$ appears on lead 35c which is negative with respect to ground, becoming more negative as the rotational speed "$n$" of shaft 3 increases.

The negative D.C. voltage appearing in lead 35c is filtered to remove any ripple by a two-section "L" filter 18 comprising chokes 36, 37 and capacitors 38, 39.

Returning now to the power amplifiers 14, 15, the square wave outputs are also applied to half-wave rectifiers 22, 23 respectively. Rectifier 22, to which rectifier 23 is identical, comprises diodes 40, 41 each passing one-half of the square wave input to a common junction 42 so that a series of positive pulses appear at junction 42. Rectifier 23 similarly provides positive pulses by means of diodes 43, 44 to a common junction 45. Hence both junctions 42, 45 receive a train of pulses which are positive with respect to ground. It will be appreciated by those skilled in the art, that the magnetic pickups of sensors 12, 13 can be displaced slightly in phase relationship to yield a smoother rectified signal at the common junction 46. However, the voltage levels are such that either rectifier alone, when the pulses are at a frequency corresponding to a shaft speed above 200 r.p.m., will furnish an average voltage sufficient for a constant limiting voltage, as will be described.

The voltage regulator 24 provides a high quality voltage regulation to yield a positive D.C. voltage used for a reference limiting voltage $V_1$. Voltage regulator 24 comprises a filter capacitor 47 and three stages of voltage regulation comprised of resistors 48, 49, 50 and Zener diodes 51, 52, 53 connected as shown. For example, the first stage consisting of resistor 48 and diode 51 might regulate to 20 volts, the second stage consisting of resistor 49, diode 52 to 15 volts and the third stage consisting of resistor 50 and diode 53 to 9.2 volts. A high quality constant positive D.C. voltage will appear at lead 54 whenever the shaft 3 is turning greater than approximately 200 r.p.m. A movable tap 55 on a potentiometer 56 is set by the final speed set knob 27 to provide a limiting voltage $V_1$ representing a desired final turbine speed. A separate external positive voltage supply with switch 56a is employed to supply a supplementary limiting voltage to potentiometer 56 until the shaft is turning fast enough (about 200 r.p.m.) to make the reference voltage supply be self-sustaining. Contact 56a may be actuated by mechanical connections through the final speed knob 27, as shown.

The voltage appearing on tap 55, which is set by the final speed knob 27, limits the voltage to which the integrator 25 will integrate. Integrator 25 comprises an operational amplifier consisting of a high gain D.C. amplifier 57 with an assisting power amplifier consisting of NPN transistor 58 connected at its output as an "emitter follower." The high gain D.C. amplifier 57 is well known in the art and is a commercially obtainable electronic device, preferably solid state, such as is used in analog computers to perform various operations such as addition, multipication, integration, etc. The amplifier might, for instance, be of the type described in chapter 5 of "Electronic Analog Computers" by D.A. Korn and T. M. Korn, McGraw-Hill, New York, 1952. A capacitor 59 in the feedback loop converts D.C. amplifier 57, together with the assisting power amplifier, into an integrating device. A diode 60 with associated resistor 61 acts as a limiting circuit to sharply limit the output of the amplifier to a value very slightly less than the voltage $V_1$ on movable potentiometer tap 55. Hereinafter it will be understood that when the voltage $V_1$ is spoken of as limiting the output of the integrator, it is meant that actually a voltage very close to but slightly less than $V_1$ serves to limit. When the voltage at junction 62, herein designated $V_r$ for reference voltage, reaches voltage $V_e$ that on tap 55, diode 60 begins to cut off, opening the feedback loop through capacitor 59. This causes the output voltage at junction 62 to be sharply limited to that on potentiometer 55, or, in other words, to limit the rising reference voltage $V_r$ substantially to a final desired value $V_1$.

The input to the operational amplifier 57 is selected by positioning a movable tap 64 of a voltage divider 65 connected between an external negative D.C. voltage source and ground. Since an operational amplifier, such as 57, inverts the polarity of the input voltage, the output will be positive. Tap 64 is moved by actuating the "accelerating time" knob 28. The magnitude of the negative voltage applied to the input of amplifier 57, together with the time constant resulting from the combination of feedback capacitor 59 and a resistor 66, determines the integrating rate or rate of voltage increase with respect to time, as is well known in the art. Thus the positive reference voltage $V_r$ appearing at junction 62 will increase with time at a rate determined by the setting of knob 28 until it is sharply limited to a value substantially that of voltage $V_1$ determined by the setting of knob 27.

The voltage at junction 62 is supplied to each of the two summing amplifiers 20, 21. The summer 20, to which summer 21 is identical, includes two input impedances, the first a resistor 67 and the second a series combination consisting of the variable resistor 68 and resistor 69. These are connected together at a common junction 70 at the input of a high gain D.C. operational amplifier 71, which may be identical to the high gain D.C. operational amplifier 57 of the integrator 25. A feedback resistor 72 is also connected to input junction 70. If the elements in the low value gate 26 which are common to both summers 20, 21 are disregarded for a moment, each summer will produce at its output end a speed error signal $V_e$, i.e., a voltage which is the summation of the positive reference voltage (desired speed) and a negative feedback voltage (actual speed). Since the amplifier performs an inverting, as well as a summing function, an indication of too slow a speed, i.e. a reference voltage with a magnitude greater than that of the feedback voltage, would result in a net negative voltage for the speed error $V_e$, rather than a positive voltage as might be supposed at first glance. A negative voltage causes the steam valves to open wider as mentioned previously. The same would be true of summer 21.

The summers 20, 21 are arranged so that their outputs oppose one another at a common output junction 73 which, in conjunction with the diodes 74, 75 and a biasing resistor 76, forms an amplitude comparison circuit (low value gate 26). This arrangement allows only one of the two error signals from the two summers 20, 21 to appear at junction 73. An assisting power amplifier comprising an NPN transistor 77, connected as an emitter follower, is common to the output of either summer and can be disregarded for purposes of analysis. In other words, if power level of the signal is disregarded, the junction 78 may be considered as connected to junction 73.

The operation of the amplitude comparison circuit in conjunction with summers 20, 21 is as follows. Whenever a voltage appears at junction 78 which is more positive than the voltage appearing on the other (anode) side of either of the diodes 74, 75, that diode will start to cut off. Whichever diode starts to cut off, commences to open the closed loop of the associated amplifier, causing that amplifier to saturate in a negative direction and cut the diode off sharply. Hence the common output junction 78 will only receive the error signal from the summer whose diode 74 or 75 is still conducting.

For example, if a positive output voltage of operational amplifier 71 is greater than a positive output voltage of amplifier 80, the cathode of diode 75 will be more positive than its anode and cutoff will commence. Amplifier 80 will saturate and complete cutting off diode 75. Diode 74 will continue to conduct. Therefore only the output of operational amplifier 71 will be furnished to the junction 78 and amplified by power amplifier transistor 77 to appear at junction 73. It remains to note that junction 78 is connected to a negative voltage source through the biasing resistor 76. This limits the output so that it cannot be more negative than the source. Thus the valve opening signal cannot call for greater than a selected opening regardless of speed error.

In normal operation, to prevent possible excessive switching between amplifiers which might result if identical speed error signals were furnished to junction 78, one of the summers is caused to have a "preference" over the other, so that if all components are operating properly, only one summer will be in control. This is accomplished through the use of potentiometer setting knobs 29, 30. It will be seen that by adjusting either of knobs 29, 30 so as to vary the input impedances to the summers 20, 21, the reference voltage at junction 62 will be caused to have a greater or lesser effect on one summer than the other. Knobs 29, 30 are normally set so that only one of the summing amplifiers is controlling. For example, by either decreasing the resistance of variable resistor 68 or by increasing the resistance of the variable resistor 81, the positive reference voltage applied to summer 20 will be greater than that applied to summer 21, for the same turbine speed feedback signal.

Referring now to FIG. 3 of the drawing, a graph is shown of turbine speed $n$ versus the reference limiting voltage $V_1$ appearing at point A on FIG. 2. The dotted line indicates operation below 200 r.p.m. during which time a substitute limiting voltage is applied through switch 56a.

Referring to FIG. 4 of the drawing, there is shown the speed feedback or actual turbine speed signal plotted as negative D.C. feedback voltage $V_f$ versus turbine speed $n$. This voltage would appear at points B and C on FIG. 2.

Referring to FIG. 5 of the drawing, the output of the integrator 25 is shown as a time varying reference signal $V_r$ plotted against time $t$. The final desired turbine speed reference voltage $V_r$ is limited to, and hence is substantially identical with, $V_1$. This voltage appears at point D in FIG. 2.

FIG. 6 of the graph indicates a summation of desired speed and actual speeds during the acceleration of the turbine to a final speed. The top dotted line (similar to FIG. 5) shows a desired acceleration to a final constant speed. The bottom dotted line indicates actual speed increase. Due to the slight time lag in the bottom curve, a summation of the two, indicated by the solid line, results in a speed error signal during acceleration which holds the turbine valves sufficiently far open to obtain the desired acceleration.

FIG. 7 is a representation of the two speed error voltages $V_e$ which would be received at the outputs of the summers E, F in the absence of a low value gate. Due to the gating action of the comparison circuit described previously, only one of the signals appears. The more positive error signal, represented by the solid line, appears at point G (after being amplified) to control the valve movements, a positive signal indicating a closing valve movement. The less positive speed error signal, represented by the dotted line, is the signal which would appear from the opposing summer if its diode had not been cut off.

The operation of the redundant speed control system should now be apparent from the following description. From the block diagram of FIG. 1, it will be observed that there are duplicate channels sensing actual turbine speed. It will also be observed that there is a single channel for obtaining final or desired turbine speed. It is of particular importance to note that all three of the aforesaid electrical signals, i.e. two actual speed feedback signals and one desired speed signal are derived from a common source, i.e. the two sensors disposed near the shaft and generating voltages only when the shaft is turning. It has been suggested in the prior art that actual speed signals may be generated from the rotating shaft. The present invention, however, also generates a constant voltage representing a desired turbine final speed from the rotating shaft. This final or desired turbine speed signal ($V_1$) might have been summed directly with each of the actual speed signals. However an important feature of the disclosed embodiment is the incorporation of the integrator 25 to cause the desired or reference speed voltage $V_r$ to increase at an adjustable rate until reaching the aforementioned final limiting value $V_1$.

Each of the actual turbine speed signal $V_f$ are summed with the single reference speed signal $V_r$ to produce redundant speed error signals (varying slightly in accordance with the settings on knobs 29 or 30) and these are passed to the low value gating circuit 26, which is arranged so that only the more positive of the two speed signals $V_e$ will be allowed to control the valves. It will be recalled that the more positive signal is the one which calls for a more closed valve position than does the less positive signal.

The redundant speed control system operates in such a manner that if any one component of the system fails, the turbine will continue to operate either on the redundant error signal or, at the very worst, the turbine valves will close. For example, looking at the block diagram of FIG. 1, if any element in the upper row of blocks 14, 16, 18, 20 or any element in the lower row of blocks 15, 17, 19, 21 fails, the duplicate actual speed circuit and the speed reference signal circuit will continue to operate the turbine valves, without appreciable system disturbance, by simply shifting to the redundant speed error signal, i.e. the lower voltage signal in FIG. 7. The fact that the speed reference signal is still being applied to both summers does not matter, since it will be blocked at the low value gate and cannot cause the valves to open wide.

If one element in the common circuitry fails, i.e. the voltage regulator 24, integrator 25, or low value gate 26, point G will see only an actual turbine speed signal or a very negative signal which indicates that the turbine valves should close, thereby safely preventing overspeed of the turbine.

If either of the sensors 12, 13 or either of rectifiers 22, 23 fail, the redundant speed error will control, since either sensor and rectifier is adequate to operate the voltage regulator. If both sensors 12 and 13 fail simultaneously, the speed reference signal at A will decay to zero more rapidly than the two feedback signals at B and C so that there will be a closing signal at G for a short period of time and a zero signal thereafter. This will close the turbine valve and not let them go open again.

In every case, whether one of the components in the two identical actual speed channels fails or whether one of the components in the single speed reference channel fails, the signal passed by the low value gate will either continue to operate the turbine substantially as before, or will close the valves preventing further damage, thereby providing a very reliable and safe speed control system for an electro-hydraulic governor.

Other modifications of the invention will occur to those skilled in the art, and while there has been described herein what is considered to be the preferred embodiment of the invention, it is, of course, intended to cover in the appended claims all such modifications as fall within the true spirit and scope of the invention.

What we claim as new and desire to secure by Letters Patent of the United States is:

1. A redundant speed control system for a prime mover having servo means controlling the operation thereof in response to an electrical speed error signal representing deviation from a desired speed, comprising:
    first and second means responsive to prime mover speed generating first and second electrical signals respectively proportional to actual speed,
    third means generating a third selectable constant electrical signal representing a desired prime mover speed,
    fourth and fifth means summing the first signal with the third signal and summing the second signal with the third signal respectively to produce two speed error signals representing the difference between actual and desired prime mover speeds, and
    common gating means receiving both of said error signals from the fourth and fifth means and enabling only the error signal calling for the lower speed of the prime mover to actuate said servo means.

2. A redundant speed control system for a prime mover having servo means controlling the operation thereof in response to an electrical speed error signal representing deviation from a desired speed, comprising:
    first and second means responsive to prime mover speed generating first and second electrical signals respectively proportional to actual speed,
    integrating means generating a time varying signal representing a desired acceleration of the prime mover,
    third means generating a third selectable constant electrical signal representing a desired prime mover speed, said third means being operatively connected to said integrating means so as to limit its output to a value substantially that of said third electrical signal,
    fourth and fifth means summing the first signal with the third signal and summing the second signal with the third signal respectively to produce two speed error signals representing the difference between actual and desired prime mover speeds, and
    common gating means receiving both of said error signals from the fourth and fifth means and enabling only the error signal calling for the lower speed of the prime mover to actuate said servo means.

3. The combination according to claim 2 including variable impedance means associated with at least one of said summing means for selectively attenuating at least one of the first, second or third signals in order to provide a preference for the output of either the fourth or fifth summing means by the common gating means.

4. A redundant speed control system for a turbine having servo means controlling the operation of said turbine in response to an electrical potential representing deviation from a desired speed,
    first and second means responsive to prime mover shaft rotation generating first and second periodically varying electrical signals having frequencies proportional to actual speed,
    third and fourth means converting the first and second signals respectively to third and fourth D.C. electrical potentials proportional to actual speed,
    fifth means actuated by either of said first or second means and converting said first and second periodically varying signals to a fifth constant D.C. electrical potential representing a desired prime mover speed and of an opposite polarity from said third and fourth potentials,
    first and second operational amplifiers summing the third potential with the fifth potential and the fourth potential with the fifth potential respectively to produce sixth and seventh D.C. potentials respectively representing the difference between actual an desired prime mover speeds, and
    magnitude comparison means connected to receive both said sixth and seventh potentials as an input and to pass only the one potential thereof to said servo means which calls for the lower turbine speed.

5. The combination according to claim 4 including third operational amplifier means connected as an integrator and providing an electrical potential which increases with time to each of said first and second operational amplifiers, said third amplifier being connected so that its output is limited by said fifth means to a value substantially that of said fifth constant electrical potential.

References Cited by the Examiner
UNITED STATES PATENTS 2,510,296   6/1950   Root _____ 317—5 X
3,070,071  12/1962  Cooper.

MILTON O. HIRSHFIELD, *Primary Examiner.*

L. T. HIX, *Assistant Examiner.*